US012803465B2

(12) United States Patent
Arisawa et al.

(10) Patent No.: US 12,803,465 B2
(45) Date of Patent: Nov. 17, 2026

(54) POWER CONVERTING APPARATUS, MOTOR DRIVE APPARATUS, AND REFRIGERATION-CYCLE APPLICATION DEVICE

(71) Applicant: Mitsubishi Electric Corporation, Tokyo (JP)

(72) Inventors: Koichi Arisawa, Tokyo (JP); Kengo Kawauchi, Tokyo (JP); Takaaki Takahara, Tokyo (JP); Tomohiro Kutsuki, Tokyo (JP); Haruka Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 18/714,233

(22) PCT Filed: Dec. 2, 2021

(86) PCT No.: PCT/JP2021/044204
§ 371 (c)(1),
(2) Date: May 29, 2024

(87) PCT Pub. No.: WO2023/100305
PCT Pub. Date: Jun. 8, 2023

(65) Prior Publication Data
US 2025/0219553 A1 Jul. 3, 2025

(51) Int. Cl.
*H02M 7/537* (2006.01)
*H02M 7/12* (2006.01)

(52) U.S. Cl.
CPC ............. *H02M 7/537* (2013.01); *H02M 7/12* (2013.01); *F25B 2600/021* (2013.01)

(58) Field of Classification Search
CPC .......... H02M 7/537; H02M 7/12; H02M 1/12; H02M 1/14; H02M 7/53871;
(Continued)

(56) References Cited

U.S. PATENT DOCUMENTS 5,959,430 A 9/1999 Yuki et al.
6,958,589 B2 * 10/2005 Kawaji ................ H02P 27/045 318/52
(Continued)

FOREIGN PATENT DOCUMENTS

JP 10-271900 A 10/1998
JP 2001-095294 A 4/2001
(Continued)

OTHER PUBLICATIONS

International Search Report of the International Searching Authority mailed Jan. 18, 2022 in corresponding International Patent Application No. PCT/JP2021/044204 (and English translation).

*Primary Examiner* — David Luo
(74) *Attorney, Agent, or Firm* — Posz Law Group, PLC

(57) ABSTRACT

A power converting apparatus includes: a rectifier unit rectifying first alternating-current power supplied from a commercial power supply; a capacitor connected to an output end of the rectifier unit; an inverter connected across the capacitor, the inverter generating second alternating-current power and outputting the second alternating-current power to a motor; a voltage detecting unit detecting a first direct-current bus voltage, the first direct-current bus voltage being a voltage across the capacitor; and a control unit including a specific frequency bandpass unit passing a defined frequency band among power-supply pulsatile components contained in the first direct-current bus voltage, the control unit controlling an operation of the inverter and the motor by using a second direct-current bus voltage, the second direct-current bus voltage being the first direct-current bus voltage after passing through the specific frequency bandpass unit.

12 Claims, 11 Drawing Sheets

(58) Field of Classification Search
CPC ................. H02M 7/5395; H02M 1/007; F25B 2600/021; F25B 49/025; F25B 13/00; F25B 2600/024; F25B 2700/151
USPC ................................. 318/504, 500, 408, 400
See application file for complete search history.

(56) References Cited

U.S. PATENT DOCUMENTS

| | | | | |
|---|---|---|---|---|
| 7,912,530 | B2 * | 3/2011 | Seki ....................... | G01R 33/02 324/260 |
| 9,787,246 | B2 * | 10/2017 | Tsumura ................. | H02P 27/08 |
| 10,284,132 | B2 * | 5/2019 | Marcinkiewicz ....... | H02P 27/06 |
| 2016/0380575 | A1 | 12/2016 | Tsumura et al. | |

FOREIGN PATENT DOCUMENTS

| | | | |
|---|---|---|---|
| JP | 2013-121234 | A | 6/2013 |
| JP | 2018-007564 | A | 1/2018 |
| WO | 2015/140867 | A1 | 9/2015 |

* cited by examiner

POWER CONVERTING APPARATUS, MOTOR DRIVE APPARATUS, AND REFRIGERATION-CYCLE APPLICATION DEVICE

CROSS REFERENCE TO RELATED APPLICATION

This application is a U.S. national stage application of PCT/JP2021/044204 filed on Dec. 2, 2021, the contents of which are incorporated herein by reference.

FIELD

The present disclosure relates to a power converting apparatus that converts alternating-current power into desired power, a motor drive apparatus, and a refrigeration-cycle application device.

BACKGROUND

Conventionally, an apparatus such as a motor drive apparatus that controls an operation of a motor controls an operation of converter, an inverter, and the like according to a state of power input to the converter, a state of power output from the converter and input to the inverter, a state of power output from the inverter and input to the motor, and the like. Such a technique is disclosed in Patent Literature 1.

PATENT LITERATURE

Patent Literature 1: Japanese Patent Application Laid-open No. 2018-7564

In a case where there is a smoothing capacitor between a converter and an inverter, a direct-current bus voltage that is a voltage across the capacitor is detected as a parameter of the above-described power states, and is utilized for controlling the converter, the inverter, and the like. The direct-current bus voltage, utilized for control, is detected at a timing synchronized with a peak or a valley of a carrier used in the control of the inverter, at a timing when a control cycle is synchronized with a power supply cycle of a commercial power supply connected to the converter, or the like, so that an average value thereof can be roughly acquired. However, in a case where a detection timing is shifted due to an error in the control cycle, an error in the power supply cycle, or the like, due to the oscillator, the average value of the direct-current bus voltage cannot be acquired, and a low-frequency pulsation is superimposed on the detection value of the direct-current bus voltage. In this case, the inverter and the like are controlled by using the detection value of the direct-current bus voltage on which the low-frequency pulsation is superimposed, so that there is a problem that the accuracy of the control is reduced.

The present disclosure has been made in view of the above, and an object of the present disclosure is to obtain a power converting apparatus capable of improving the accuracy of the control using a direct-current bus voltage.

In order to solve the above-described problems and achieve the object, a power converting apparatus according to the present disclosure includes: a rectifier unit rectifying first alternating-current power supplied from a commercial power supply; a capacitor connected to an output end of the rectifier unit; an inverter connected across the capacitor, the inverter generating second alternating-current power and outputting the second alternating-current power to a motor; a detecting unit detecting a first direct-current bus voltage, the first direct-current bus voltage being a voltage across the capacitor; and a control unit including a specific frequency bandpass unit passing a defined frequency band among power-supply pulsatile components contained in the first direct-current bus voltage, the control unit controlling an operation of the inverter and the motor by using a second direct-current bus voltage, the second direct-current bus voltage being the first direct-current bus voltage after passing through the specific frequency bandpass unit.

SUMMARY

The power converting apparatus according to the present disclosure can achieve an effect in which the accuracy of the control using the direct-current bus voltage can be improved.

DETAILED DESCRIPTION

Hereinafter, a power converting apparatus, a motor drive apparatus, and a refrigeration-cycle application device according to embodiments of the present disclosure will be described in detail with reference to the drawings.

First Embodiment

Figure 1:
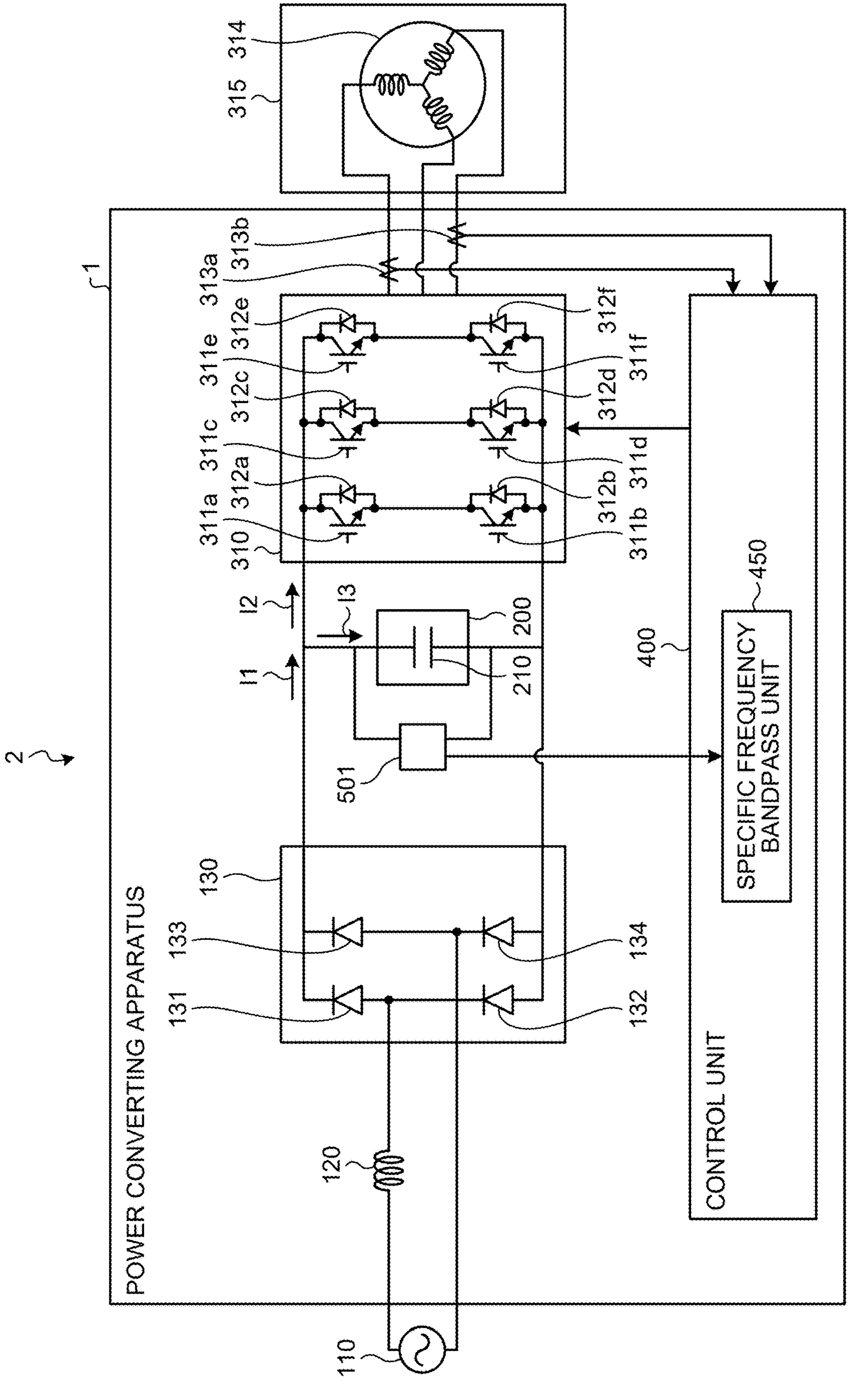
FIG. 1 is a diagram illustrating a configuration example of a power converting apparatus according to a first embodiment.

FIG. 1 is a diagram illustrating a configuration example of a power converting apparatus 1 according to a first embodiment. The power converting apparatus 1 is connected to a commercial power supply 110 and a compressor 315. The power converting apparatus 1 converts first alternating-current power of a power supply voltage Vs, supplied from the commercial power supply 110 that is a single-phase commercial power supply, into second alternating-current power with desired amplitude and phase, and supplies the second alternating-current power to the compressor 315. The power converting apparatus 1 includes a reactor 120, a rectifier unit 130, a voltage detecting unit 501, a smoothing unit 200, an inverter 310, current detecting units 313*a* and 313*b*, and a control unit 400. Note that the power converting apparatus 1 and a motor 314 included in the compressor 315 constitute a motor drive apparatus 2.

The reactor 120 is connected between the commercial power supply 110 and the rectifier unit 130. The rectifier unit 130 includes a bridge circuit including rectifier elements 131 to 134, and rectifies and outputs the first alternating-current power of the power supply voltage Vs supplied from the commercial power supply 110. The rectifier unit 130 performs full-wave rectification. The voltage detecting unit 501 detects a direct-current bus voltage $V_{dc}$ that is a voltage of the smoothing unit 200, that is, a voltage across a capacitor 210. The smoothing unit 200 is charged by a current, which is rectified by the rectifier unit 130 and flows from the rectifier unit 130 into the smoothing unit 200. The voltage detecting unit 501 outputs the detected voltage value to the control unit 400. The voltage detecting unit 501 is a detecting unit that detects a power state of the capacitor 210.

The smoothing unit 200 is connected to an output end of the rectifier unit 130. The smoothing unit 200 includes the capacitor 210 as a smoothing element, and smooths the power rectified by the rectifier unit 130. The capacitor 210 is, for example, an electrolytic capacitor, a film capacitor, or the like. The capacitor 210 is connected to the output end of the rectifier unit 130, and has a capacitance to smooth the power rectified by the rectifier unit 130. A voltage generated in the capacitor 210 by the smoothing is not in a full-wave rectified waveform shape of the commercial power supply 110, but in a waveform shape in which a voltage ripple, corresponding to the frequency of the commercial power supply 110, is superimposed on a direct-current component. Therefore, the voltage does not greatly pulsate. In a case where the commercial power supply 110 is a single-phase commercial power supply, the frequency of the voltage ripple has a primary component that is twice the frequency of the power supply voltage Vs. In a case where the power input from the commercial power supply 110 and the power output from the inverter 310 do not change, the amplitude of the voltage ripple is determined by the capacitance of the capacitor 210. For example, the voltage ripple generated in the capacitor 210 pulsates in a range in which the maximum value of the voltage ripple is less than twice the minimum value of the voltage ripple.

The inverter 310 is connected to the smoothing unit 200, that is, connected across the capacitor 210. The inverter 310 includes switching elements 311*a* to 311*f* and freewheeling diodes 312*a* to 312*f*. The inverter 310 turns on or off the switching elements 311*a* to 311*f* under the control of the control unit 400 and converts the power output from the rectifier unit 130 and the smoothing unit 200 into the second alternating-current power with desired amplitude and phase. That is, the inverter 310 generates the second alternating-current power and outputs the second alternating-current power to the motor 314 of the compressor 315. The current detecting units 313*a* and 313*b* each detect a current value of one-phase from among three-phase currents output from the inverter 310, and outputs the detected current value to the control unit 400. Note that, by acquiring current values of two phases from among the current values of three phases, which are output from the inverter 310, the control unit 400 can compute a current value of the remaining one phase, which is output from the inverter 310. The compressor 315 is a load and includes the motor 314 for driving the compressor. The motor 314 rotates according to the amplitude and the phase of the second alternating-current power supplied from the inverter 310 and performs a compression operation. For example, in a case where the compressor 315 is a hermetic compressor used in an air conditioner or the like, the load torque of the compressor 315 can be regarded as a constant torque load in many cases. FIG. 1 illustrates a case where a motor winding of the motor 314 is a Y connection, but this is an example, and the present disclosure is not limited thereto. The motor winding of the motor 314 may be a A connection, or may have a specification capable of switching between the Y connection and the A connection.

Note that, in the power converting apparatus 1, the arrangement of the components illustrated in FIG. 1 is an example, and the arrangement of the components is not limited to the example illustrated in FIG. 1. For example, the reactor 120 may be disposed downstream of the rectifier unit 130. Furthermore, the power converting apparatus 1 may include a booster unit, or the rectifier unit 130 may have a function of the booster unit. In the following description, the voltage detecting unit 501 and the current detecting units 313*a* and 313*b* may be collectively referred to as a detecting unit in some cases. Furthermore, a voltage value detected by the voltage detecting unit 501 and current values detected by the current detecting units 313*a* and 313*b* may each be referred to as a detection value in some cases.

The control unit 400 acquires a voltage value of the direct-current bus voltage $V_{dc}$ of the smoothing unit 200 from the voltage detecting unit 501, and acquires current values of the second alternating-current power with desired amplitude and phase from the current detecting units 313*a* and 313*b*. Here, the second alternating-current power is obtained through conversion by the inverter 310. The control unit 400 controls an operation of the inverter 310, specifically, controls turning on or off of the switching elements 311*a* to 311*f* included in the inverter 310, by using the detection values detected by the respective detecting units. Furthermore, the control unit 400 controls an operation of the motor 314 by using the detection values detected by the respective detecting units. In the present embodiment, the control unit 400 controls the operation of the inverter 310 so as to output the second alternating-current power from the inverter 310 to the compressor 315, which is a load. Here, the second alternating-current power includes a pulsation that depends on the pulsation of the power flowing from the rectifier unit 130 into the capacitor 210 of the smoothing unit 200. The pulsation that depends on the pulsation of the power flowing into the capacitor 210 of the smoothing unit 200 is, for example, a pulsation that varies depending on the frequency, and the like, of the pulsation of the power flowing into the capacitor 210 of the smoothing unit 200. With such a configuration, the control unit 400 reduces the current flowing through the capacitor 210 of the smoothing unit 200. Note that the control unit 400 may not use all the detection values acquired from the respective detecting units, and may perform control by using some detection values.

The control unit 400 performs control such that any of the speed, the voltage, and the current of the motor 314 becomes a desired state. Here, in a case where the motor 314 is used for driving the compressor 315 and the compressor 315 is a hermetic compressor, it is difficult to mount a position sensor that detects a rotor position to the motor 314 due to the structural and cost constraints. Therefore, the control unit 400 controls the motor 314 without a position sensor. The position sensorless control method of the motor 314 includes primary magnetic flux constant control, sensorless vector control, and the like. In the present embodiment, description will be made based on the sensorless vector control as an example. Note that the control method described below can be applied to the primary magnetic flux constant control or other methods with a minor change. In the present embodiment, as will be described later, the control unit 400 controls the operation of the inverter 310 and the motor 314 by using dq rotational coordinates that rotate in synchronization with the rotor position of the motor 314.

In the present embodiment, the control unit 400 includes a specific frequency bandpass unit 450 that passes a defined frequency band among power-supply pulsatile components contained in the direct-current bus voltage $V_{dc}$ detected by the voltage detecting unit 501. The control unit 400 controls the operation of the inverter 310 and the motor 314 by using a direct-current bus voltage $V_{dc}'$. The direct-current bus voltage $V_{dc}'$ is the direct-current bus voltage $V_{dc}$, detected by the voltage detecting unit 501, after passing through the specific frequency bandpass unit 450. In the following description, the direct-current bus voltage $V_{dc}$ detected by the voltage detecting unit 501 may be referred to as a first direct-current bus voltage, and the direct-current bus voltage $V_{dc}'$, which is the direct-current bus voltage $V_{dc}$ after passing through the specific frequency bandpass unit 450, may be referred to as a second direct-current bus voltage in some cases.

In a case where the frequency of the power-supply pulsatile components contained in the direct-current bus voltage $V_{dc}$ detected by the voltage detecting unit 501 is n times that of the commercial power supply 110, that is, in a case where the direct-current bus voltage $V_{dc}$ pulsates with the frequency n times that of the commercial power supply 110, in the present embodiment, an m-th order filter is applied as the specific frequency bandpass unit 450. Specifically, the frequency n times that of the commercial power supply 110 is a frequency n times that of the power supply voltage Vs supplied from the commercial power supply 110. Note that n and m are integers of two or more. As the specific frequency bandpass unit 450, a finite impulse response (FIR) filter or an infinite impulse response (IIR) filter may be used instead of the m-th order filter.

Figure 2:
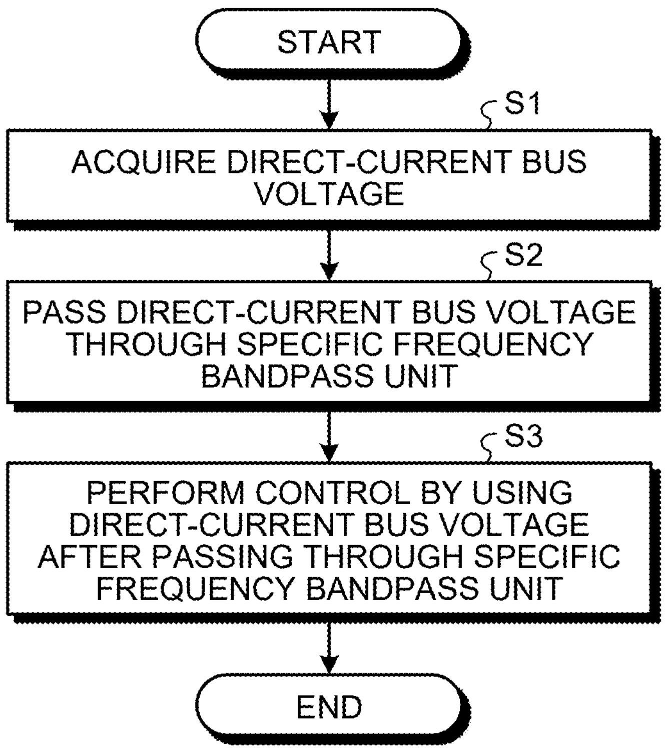
FIG. 2 is a flowchart illustrating an operation of a control unit included in the power converting apparatus according to the first embodiment.

An operation of the control unit 400 will be described with reference to a flowchart. FIG. 2 is a flowchart illustrating the operation of the control unit 400 included in the power converting apparatus 1 according to the first embodiment. The control unit 400 acquires the direct-current bus voltage $V_{dc}$, which is a detection value, of the capacitor 210 from the voltage detecting unit 501 (step S1). The control unit 400 causes the acquired direct-current bus voltage $V_{dc}$ to pass through the specific frequency bandpass unit 450 (step S2). The control unit 400 controls the inverter 310 and the like by using the direct-current bus voltage $V_{dc}'$, which is the direct-current bus voltage $V_{dc}$ after passing through the specific frequency bandpass unit 450 (step S3).

Figure 3:
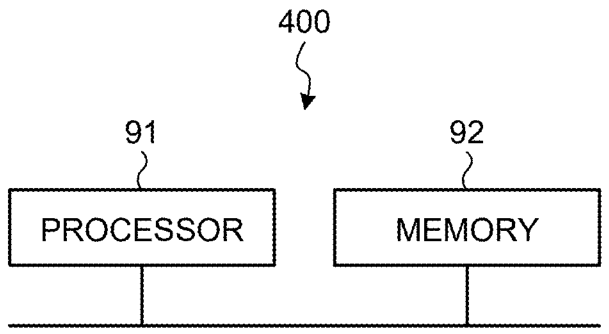
FIG. 3 is a diagram illustrating an example of a hardware configuration that implements the control unit included in the power converting apparatus according to the first embodiment.

Next, a hardware configuration of the control unit 400 included in the power converting apparatus 1 will be described. FIG. 3 is a diagram illustrating an example of the hardware configuration that implements the control unit 400 included in the power converting apparatus 1 according to the first embodiment. The control unit 400 is implemented by a processor 91 and a memory 92.

The processor 91 may be a central processing unit (CPU, also referred to as a central processing device, a processing device, a computing device, a microprocessor, a microcomputer, a processor, a digital signal processor (DSP)), or may be a system large scale integration (LSI). Examples of the memory 92 can include a nonvolatile or volatile semiconductor memory such as a random access memory (RAM), a read only memory (ROM), a flash memory, an erasable programmable read only memory (EPROM), and an electrically erasable programmable read only memory (EEPROM (registered trademark). Furthermore, the memory 92 is not limited thereto, and may be a magnetic disk, an optical disk, a compact disk, a mini disk, or a digital versatile disc (DVD).

As described above, according to the present embodiment, in the power converting apparatus 1, the control unit 400 is configured to acquire the direct-current bus voltage $V_{dc}$ detected by the voltage detecting unit 501, and to control the inverter 310 and the like by using the direct-current bus voltage $V_{dc}'$, which is the direct-current bus voltage $V_{dc}$ having passed through the specific frequency bandpass unit 450. Therefore, the control unit 400 can improve the accuracy of the control using the direct-current bus voltage $V_{dc}$.

Second Embodiment

In a second embodiment, a case will be described where a high-pass filter is used as a specific example of the specific frequency bandpass unit 450. In the second embodiment, the commercial power supply 110 connected to the power converting apparatus 1 is a single-phase commercial power supply as illustrated in FIG. 1.

Figure 4:
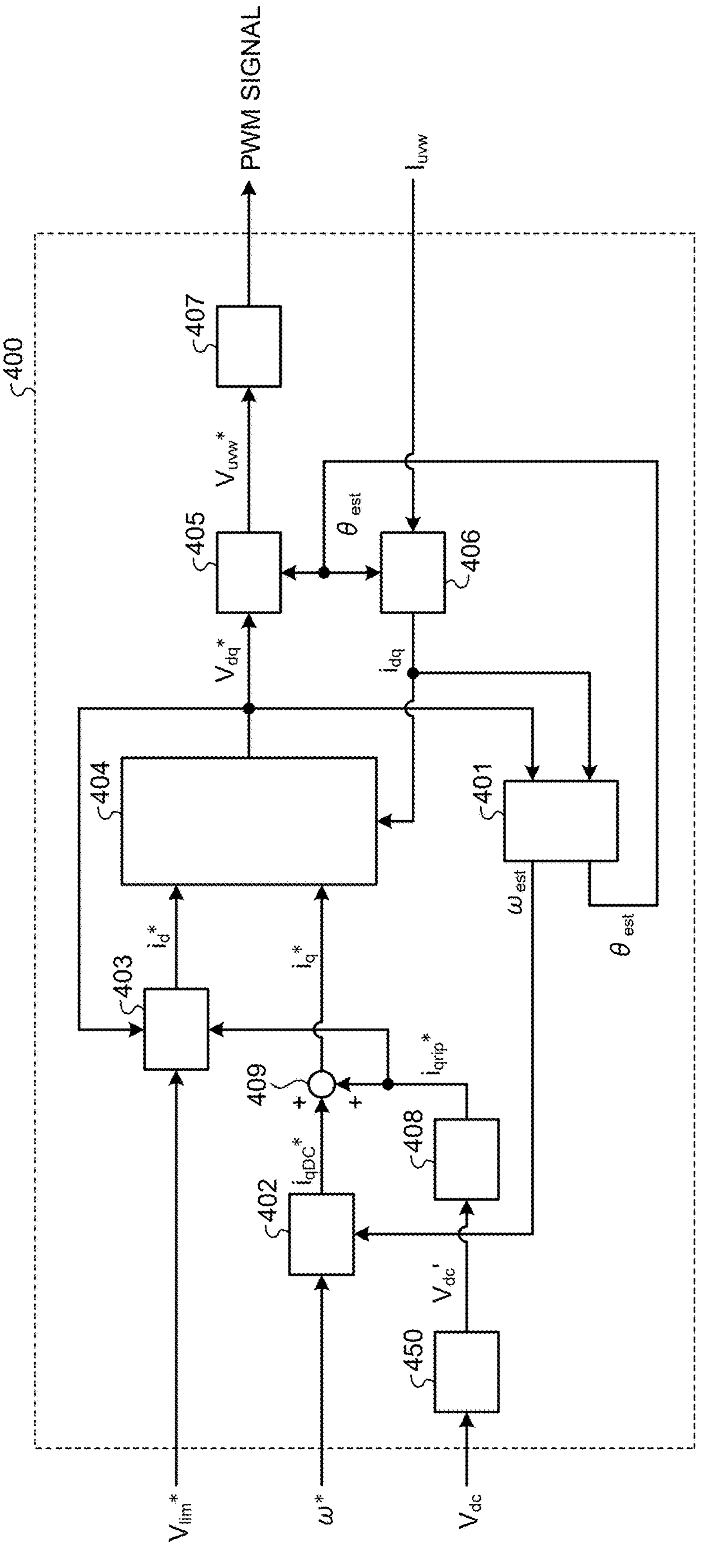
FIG. 4 is a block diagram illustrating a configuration example of a control unit included in a power converting apparatus according to a second embodiment.

In the second embodiment, the power converting apparatus 1 has a configuration similar to that of the power converting apparatus 1 in the first embodiment illustrated in FIG. 1. FIG. 4 is a block diagram illustrating a configuration example of the control unit 400 included in the power converting apparatus 1 according to the second embodiment. The control unit 400 includes a rotor position estimation unit 401, a speed control unit 402, a magnetic flux weakening control unit 403, a current control unit 404, coordinate conversion units 405 and 406, a PWM signal generation unit 407, a q-axis current pulsation computing unit 408, an addition unit 409, and the specific frequency bandpass unit 450.

The rotor position estimation unit 401 estimates, from a dq-axis voltage command vector $V_{dq}$* and a dq-axis current vector $i_{dq}$ applied to the motor 314, an estimated phase angle $\theta_{est}$, which is a direction of a rotor magnetic pole on a dq axis, and an estimated speed $\omega_{est}$, which is a rotor speed, with respect to the rotor (not illustrated) included in the motor 314.

The speed control unit 402 generates, from a speed command $\omega^*$ and the estimated speed $\omega_{est}$, a q-axis current command $i_{qDc}^*$. Specifically, the speed control unit 402 automatically adjusts the q-axis current command $i_{qDC}^*$ such that the speed command $\omega^*$ matches the estimated speed $\omega_{est}$. In a case where the power converting apparatus 1 is used as a refrigeration-cycle application device in an air conditioner or the like, the speed command ω* is based on, for example, a temperature detected by a temperature sensor (not illustrated), information indicating a set temperature instructed from a remote controller, which is an operation unit (not illustrated), operation mode selection information, operation start and operation end instruction information, and the like. The operation mode includes, for example, heating, cooling, dehumidification, and the like.

The magnetic flux weakening control unit 403 automatically adjusts a d-axis current command $i_d'$ such that an absolute value of the dq-axis voltage command vector $V_{dq}$* falls within a limiting value of a voltage limiting value $V_{lim}$*. Furthermore, the magnetic flux weakening control unit 403 performs magnetic flux weakening control in consideration of a q-axis current pulsation command $i_{qrip}$* computed by the q-axis current pulsation computing unit 408. The magnetic flux weakening control falls roughly into two categories: a method of calculating the d-axis current command $i_d$* from an equation of a voltage limit ellipse; and a method of calculating the d-axis current command $i_d'$ such that the deviation between absolute values of the voltage limiting value $V_{lim}$* and the dq-axis voltage command vector $V_{dq}$* becomes zero, and either method may be used.

The current control unit 404 controls the current flowing through the motor 314 by using a q-axis current command $i_q$* and the d-axis current command $i_d$*, and generates the dq-axis voltage command vector $V_{dq}$*. Specifically, the current control unit 404 automatically adjusts the dq-axis voltage command vector $V_{dq}$* such that the dq-axis current vector $i_{dq}$ follows the d-axis current command $i_d'$ and the q-axis current command $i_q$*. In the following description, the dq-axis voltage command vector $V_{dq}$* may simply be referred to as a dq-axis voltage command in some cases.

The coordinate conversion unit 405 coordinate-converts the dq-axis voltage command vector $V_{dq}$* from dq coordinates to a voltage command $V_{uvw}$* of an alternating-current quantity on the basis of the estimated phase angle $\theta_{est}$.

The coordinate conversion unit 406 coordinate-converts a current $l_{uvw}$ flowing through the motor 314 from the alternating-current quantity to the dq-axis current vector $i_{dq}$ of the dq coordinates on the basis of the estimated phase angle $\theta_{est}$. As described above, with respect to the current $l_{uvw}$ flowing through the motor 314, the control unit 400 can acquire current values of two phases, which are detected by the current detecting units 313*a* and 313*b*, from among the current values of the three phases, which are output from the inverter 310. In addition, the control unit 400 can acquire a current value of the remaining one phase by using the current values of the two phases. Furthermore, in the present embodiment, a method of reproducing the three-phase current by acquiring the current value of the current flowing through the motor 314 is described, but the reproducing may be performed by another method such as a method of reproducing the three-phase current by acquiring a current value of a current flowing between the capacitor 210 of the smoothing unit 200 and the inverter 310.

The PWM signal generation unit 407 generates a PWM signal on the basis of the voltage command $V_{uvw}$* obtained through coordinate-conversion by the coordinate conversion unit 405. The control unit 400 applies a voltage to the motor 314 by outputting the PWM signal generated by the PWM signal generation unit 407 to the switching elements 311*a* to 311*f* of the inverter 310.

The q-axis current pulsation computing unit 408 computes a q-axis current pulsation by using the direct-current bus voltage $V_{dc}'$, and generates the above-described q-axis current pulsation command $i_{grip}$*, which is a pulsatile component of the q-axis current command $i_q$*. Specifically, the q-axis current pulsation computing unit 408 calculates the q-axis current pulsation command $i_{grip}$* on the basis of the direct-current bus voltage $V_{dc}'$. The direct-current bus voltage $V_{dc}'$ is the direct-current bus voltage $V_{dc}$, detected by the voltage detecting unit 501, after passing through the specific frequency bandpass unit 450. The pulsation amplitude of the q-axis current $i_q$ varies depending on the driving condition of the motor 314. Therefore, the q-axis current pulsation computing unit 408 determines the amplitude by appropriately considering the driving condition.

The addition unit 409 adds the q-axis current command $i_{qDC}$* output from the speed control unit 402 and the q-axis current pulsation command $i_{grip}$* computed by the q-axis current pulsation computing unit 408 to generate the q-axis current command $i_q$*, and outputs the q-axis current command $i_q$* to the current control unit 404.

Figure 5:
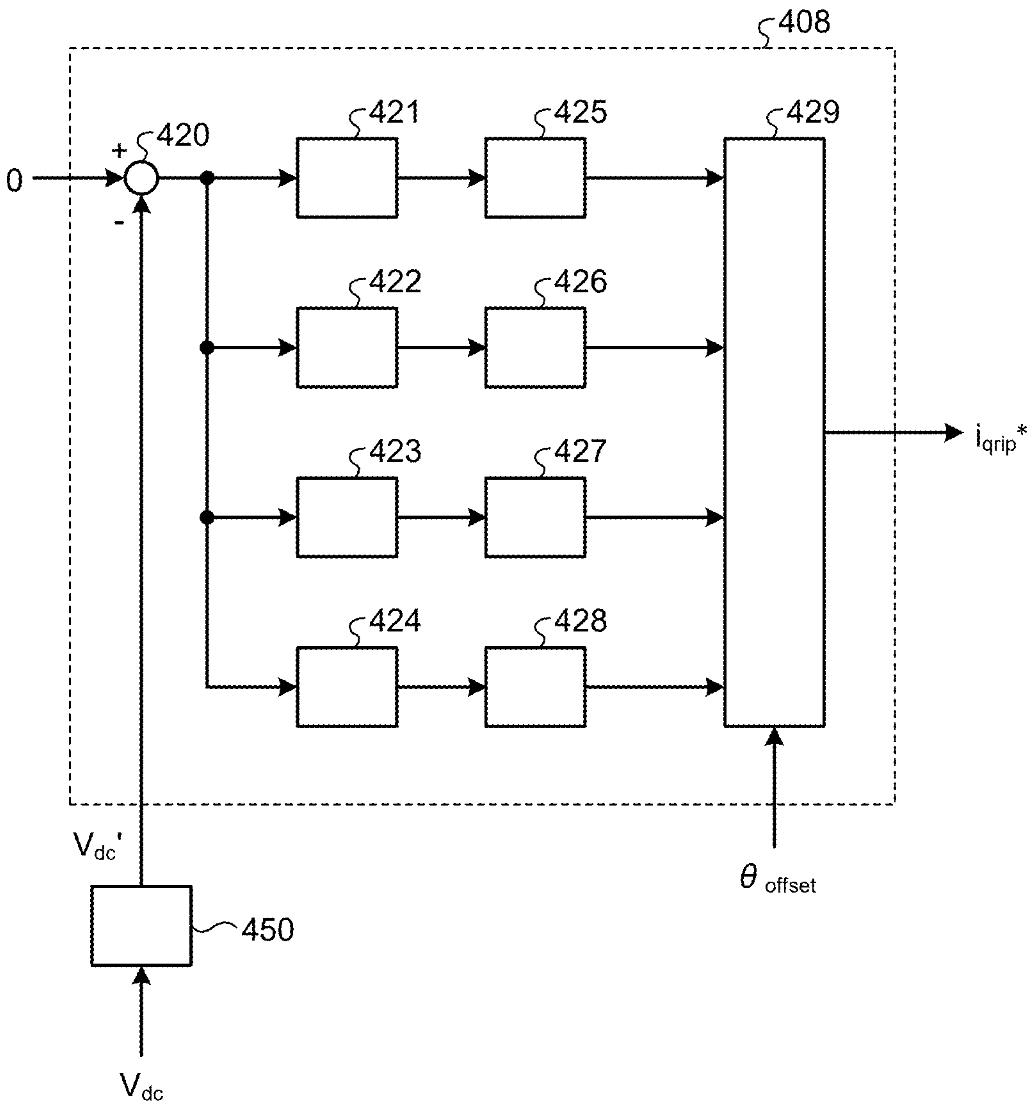
FIG. 5 is a block diagram illustrating a configuration example of a q-axis current pulsation computing unit included in the control unit of the power converting apparatus according to the second embodiment.

FIG. 5 is a block diagram illustrating a configuration example of the q-axis current pulsation computing unit 408 included in the control unit 400 of the power converting apparatus 1 according to the second embodiment. The q-axis current pulsation computing unit 408 includes a subtraction unit 420, Fourier coefficient computing units 421 to 424, proportional integral differential (PID) control units 425 to 428, and an alternating-current restoration unit 429. Note that the specific frequency bandpass unit 450 is also illustrated in FIG. 5.

The subtraction unit 420 computes a deviation between a target value, which is zero, and the direct-current bus voltage $V_{dc}'$.

The Fourier coefficient computing units 421 to 424 calculate amplitudes of a sin 2f component, a cos 2f component, a sin 4f component, and a cos 4f component, respectively, included in the deviation computed by the subtraction unit 420 with the power supply frequency of the commercial power supply 110 as a 1*f* component. The Fourier coefficient computing units 421 to 424 only have different target specific frequency components and the calculation contents are similar to each other.

The PID control units 425 to 428 are each connected to one of the Fourier coefficient computing units 421 to 424. The PID control units 425 to 428 perform proportional integral derivative control such that the specific frequency components of the deviation calculated by the Fourier coefficient computing units 421 to 424 each become zero. The PID control units 425 to 428 receive different values input from the connected Fourier coefficient computing units 421 to 424, but only have different target specific frequency components, and the control contents are similar to each other.

The alternating-current restoration unit 429 restores an alternating-current signal by using the outputs from the PID control units 425 to 428, and outputs the restored alternating-current signal as the q-axis current pulsation command $i_{grip}$*. Here, the direct-current bus voltage $V_{dc}$ is obtained by integrating a charge/discharge current 13 of the capacitor 210 and dividing the value obtained through the integration by the capacitance of the capacitor 210. Therefore, there is a phase difference of 90 degrees between the charge/discharge current 13 of the capacitor 210 and the direct-current bus voltage Vac. Accordingly, the alternating-current restoration unit 429 needs to determine the q-axis current pulsation command $i_{grip}$* in consideration of the phase difference. In a case where the phase difference is $\theta_{offset}$(=π/2 [rad]) and the detection signals multiplied by the Fourier coefficient computing units 421 to 424 are sin $2\omega_{int}$, cos $2\omega_{int}$, sin $4\omega_{int}$, and cos $4\omega_{int}$, respectively, the alternating-current restoration unit 429 sets restoration signals to sin 2 $(\omega_{int}+\theta_{offset})$, cos 2 $(\omega_{int}+\theta_{offset})$, sin 4 $(\omega_{int}+\theta_{offset})$, and cos 4 $(\omega_{int}+\theta_{offset})$. The alternating-current restoration unit 429 can determine the q-axis current pulsation command $i_{grip}$* by calculating the sum of products of the outputs from the PID control units 425 to 428 and the restoration signals. Note that, as illustrated in FIG. 1, in the power converting apparatus 1, an input current from the rectifier unit 130 to the capacitor 210 of the smoothing unit 200 is set as an input current 11, an output current from the capacitor 210 of the smoothing unit 200 to the inverter 310 is set as an output current 12, and the charge/discharge current of the capacitor 210 of the smoothing unit 200 is set as the charge/discharge current 13.

The control unit 400 eliminates a direct-current component from the direct-current bus voltage $V_{dc}$ detected by the voltage detecting unit 501 by using the specific frequency bandpass unit 450 that is a high-pass filter, and performs pulsation detection processing, PID control, and alternating-current restoration processing in the q-axis current pulsation computing unit 408. With such a configuration, the control unit 400 can improve the stability of smoothing element current reduction control of reducing the charge/discharge current 13 of the capacitor 210, and can reduce the pulsation of the direct-current bus voltage $V_{dc}$ and the pulsation of the charge/discharge current 13 of the capacitor 210. This is because an error in pulsation detection can be reduced by eliminating the direct-current component from the direct-current bus voltage $V_{dc}$ by the specific frequency bandpass unit 450 that is a high-pass filter.

The specific frequency bandpass unit 450 that is a high-pass filter may include an FIR filter or an IIR filter. In the control unit 400, as in Equation (1), the high-pass filter may be equivalently implemented by using a low-pass filter as the specific frequency bandpass unit 450. As will be described later, in Equation (1), the second term on the right side is an expression representing a low-pass filter. Note that Equation (1) uses a second-order low-pass filter, but may use another filter, such as a first-order low-pass filter, which attenuates a high frequency range.

Formula 1

$$G_{HPF(s)} = 1 - \frac{\omega_n^2}{s^2 + 2\zeta\omega_n s + \omega_n^2} \tag{1}$$

In Equation (1), s is a Laplace operator, $\zeta$ is an attenuation coefficient, and $\omega_n$ is cutoff angular frequency. The attenuation coefficient $\zeta$ is a parameter that affects the vibrational property of the response. A filter using √(2) as the attenuation coefficient $\zeta$ is called a second-order Butterworth filter, and has a characteristic that the signal becomes −3 dB at cutoff angular frequency $\omega_n$. Note that √(2) represents a square root of 2. By using the second-order low-pass filter, attenuation performance of the pulsatile component can be improved from −20 dB/decade to −40 dB/decade as compared with the first-order low-pass filter. Therefore, both the response performance and the attenuation performance of the pulsatile component can be achieved.

In order to simplify the description, here, the attenuation coefficient $\zeta$ is set to √(2) such that the second-order low-pass filter becomes the second-order Butterworth filter, but the point at which the signal becomes −3 dB may be changed by adjusting the cutoff angular frequency $\omega_n$ and the attenuation coefficient Z. The pulsatile component can be eliminated from the signal by appropriately designing the cutoff angular frequency $\omega_n$ for the frequency component that is desired to be attenuated. For example, in order to attenuate a pulsatile component ω2f having a frequency twice the power supply frequency generated in the commercial power supply 110, the cutoff angular frequency $\omega_n$ just needs to be designed to be equal to or lower than the frequency of the pulsatile component ω2f, having a frequency twice the power supply frequency. For example, if it is desired to attenuate the pulsatile component ω2f having a frequency twice the power supply frequency by 99% from the detected direct-current bus voltage $V_{dc}$, the cutoff angular frequency $\omega_n$ just needs to be designed to be 1/10 the frequency of the pulsatile component ω2f, having a frequency twice the power supply frequency.

Figure 6:
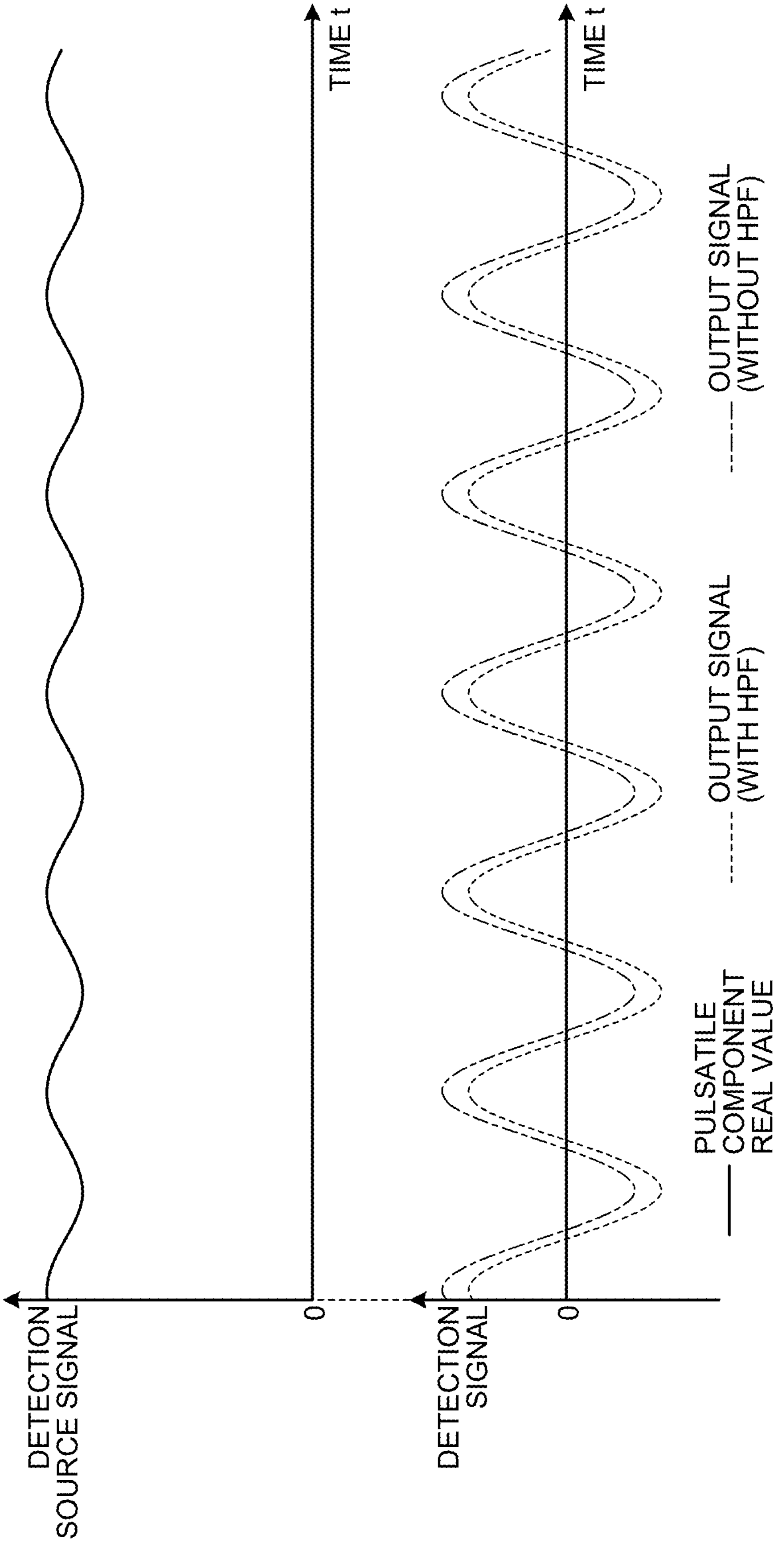
FIG. 6 is a diagram illustrating an example of operation waveforms in a case where the q-axis current pulsation computing unit included in the control unit of the power converting apparatus according to the second embodiment is regarded as a pulsation detection unit.

Here, operation waveforms in a case where the q-axis current pulsation computing unit 408 included in the control unit 400 is regarded as a pulsation detection unit will be described. FIG. 6 is a diagram illustrating an example of operation waveforms in a case where the q-axis current pulsation computing unit 408 included in the control unit 400 of the power converting apparatus 1 according to the second embodiment is regarded as a pulsation detection unit. In FIG. 6, an upper diagram illustrates a detection source signal that is the direct-current bus voltage $V_{dc}$, and a lower diagram illustrates a detection signal that is the q-axis current pulsation command $i_{grip}$*. Note that the horizontal axis represents time in both the upper diagram and the lower diagram. In the detection signal, a solid line indicates a real value of the pulsatile component that is a detection target. As a comparative example, in a case where a high-pass filter is not used for the detection source signal, it can be seen that a direct-current component is superimposed on the detection signal. The superimposition of the direct-current component deteriorates an effect of control such as the smoothing element current reduction control, described above. On the other hand, in the present embodiment, it can be seen that the signal can be detected without the superimposition of the direct-current component, by eliminating the direct-current component from the detection source signal by using a high-pass filter and then performing pulsation detection.

By using a high-pass filter for the detection value of the direct-current bus voltage $V_{dc}$, the control unit 400 can improve the accuracy of the pulsation detection, and improve the control performance in the smoothing element current reduction control and the like. Furthermore, by using a high-pass filter for the detection value of the direct-current bus voltage $V_{dc}$, the control unit 400 can prevent an increase in copper loss of the motor 314 and in conduction loss of the inverter 310 caused by the superimposition of a low-frequency pulsatile component on the direct-current bus voltage $V_{dc}$ and a motor current. Furthermore, by using a high-pass filter for the detection value of the direct-current bus voltage $V_{dc}$, the control unit 400 can improve the control performance also in, for example, vibration reduction control of reducing vibrations generated in the motor 314, the compressor 315, and the like, in addition to the smoothing element current reduction control.

Note that the characteristic of the high-pass filter in a case where the high-pass filter is used as the specific frequency bandpass unit 450 can be appropriately set in a manner of software in the control unit 400. The control unit 400 uses a second-order high-pass filter as the specific frequency bandpass unit 450. For example, in a case where the commercial power supply 110 is a single-phase commercial power supply, the control unit 400 sets the control band of the specific frequency bandpass unit 450 to be twice or lower than the frequency of the single-phase commercial power supply, and attenuates a second-order or lower component of the frequency of the single-phase commercial power supply at a rate of −40 dB/decade or more. The frequency of the single-phase commercial power supply is generally 50 Hz or 60 Hz.

As described above, according to the present embodiment, in the power converting apparatus 1 connected to the commercial power supply 110 that is a single-phase commercial power supply, the control unit 400 can improve the control performance in the smoothing element current reduction control, and the like, of reducing the charge/discharge current 13 of the capacitor 210, by using a high-pass filter as the specific frequency bandpass unit 450.

Third Embodiment

In the second embodiment, the case where the commercial power supply 110 is a single-phase commercial power supply has been described as an example of using a high-pass filter as the specific frequency bandpass unit 450. In a third embodiment, a case where the commercial power supply is a three-phase commercial power supply will be described as an example of using a high-pass filter as the specific frequency bandpass unit 450.

Figure 7:
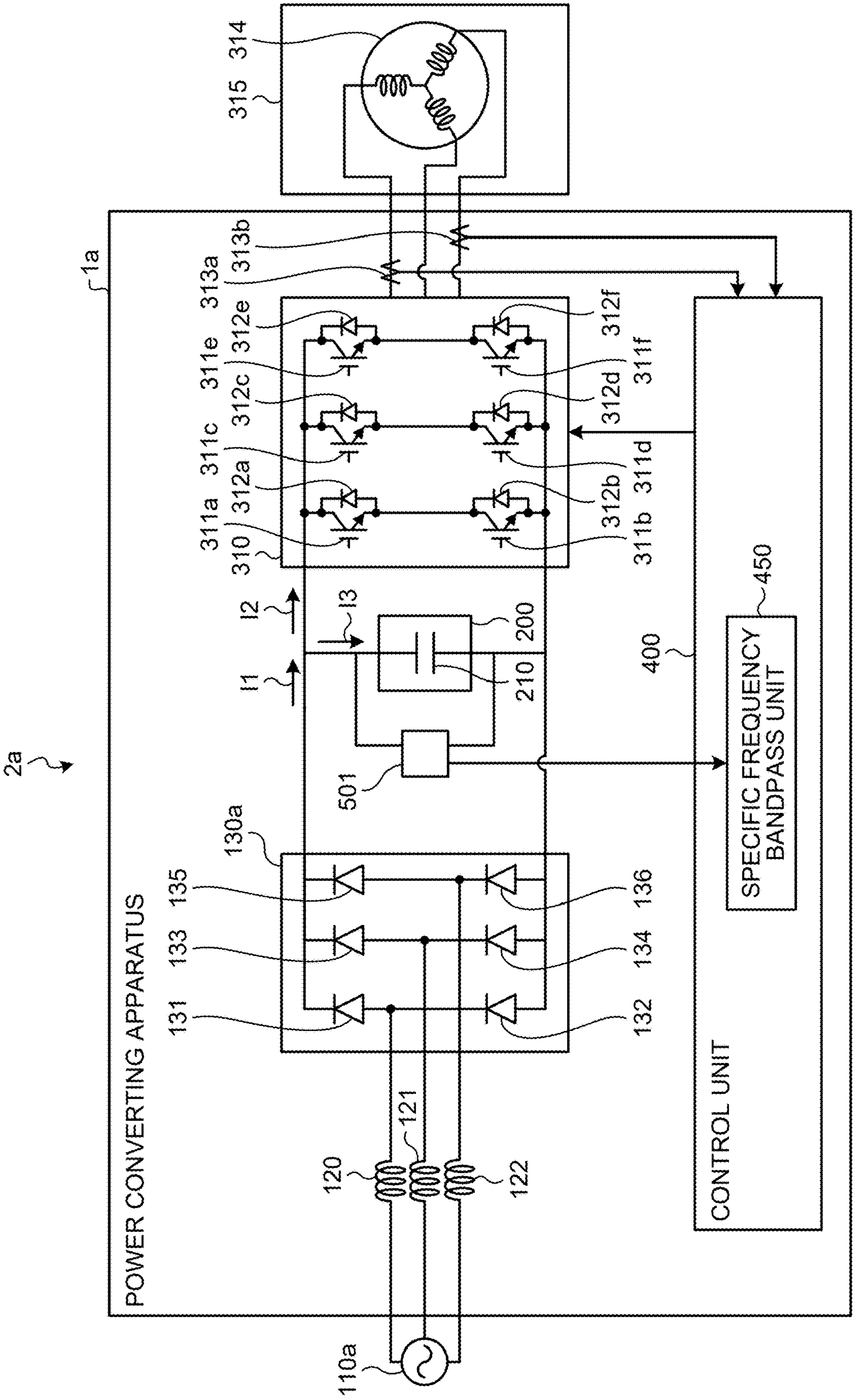
FIG. 7 is a diagram illustrating a configuration example of a power converting apparatus according to a third embodiment.

FIG. 7 is a diagram illustrating a configuration example of a power converting apparatus 1*a* according to the third embodiment. The power converting apparatus 1*a* is connected to a commercial power supply 110*a* and the compressor 315. The power converting apparatus 1*a* converts the first alternating-current power of the power supply voltage Vs, supplied from the commercial power supply 110*a* that is a three-phase commercial power supply, into the second alternating-current power with desired amplitude and phase, and supplies the second alternating-current power to the compressor 315. The power converting apparatus 1*a* includes reactors 120 to 122, a rectifier unit 130*a*, the voltage detecting unit 501, the smoothing unit 200, the inverter 310, the current detecting units 313*a* and 313*b*, and the control unit 400. Note that the power converting apparatus 1*a* and the motor 314 included in the compressor 315 constitute a motor drive apparatus 2*a*.

The reactors 120 to 122 are connected between the commercial power supply 110*a* and the rectifier unit 130*a*. The rectifier unit 130*a* includes a rectifier circuit including rectifier elements 131 to 136, and rectifies and outputs the first alternating-current power of the power supply voltage Vs supplied from the commercial power supply 110*a*. The rectifier unit 130*a* performs full-wave rectification. The voltage detecting unit 501 detects the direct-current bus voltage $V_{dc}$ that is a voltage of the smoothing unit 200, that is, a voltage across the capacitor 210. The smoothing unit 200 is charged by a current, which is rectified by the rectifier unit 130*a* and flows from the rectifier unit 130*a* to the smoothing unit 200. The voltage detecting unit 501 outputs the detected voltage value to the control unit 400. The voltage detecting unit 501 is a detecting unit that detects the power state of the capacitor 210.

The smoothing unit 200 is connected to an output end of the rectifier unit 130*a*. The smoothing unit 200 includes the capacitor 210 as a smoothing element, and smooths the power rectified by the rectifier unit 130*a*. The capacitor 210 is, for example, an electrolytic capacitor, a film capacitor, or the like. The capacitor 210 is connected to the output end of the rectifier unit 130*a*, and has a capacitance to smooth the power rectified by the rectifier unit 130*a*. A voltage generated in the capacitor 210 by the smoothing is not in a full-wave rectified waveform shape of the commercial power supply 110*a*, but in a waveform shape in which a voltage ripple, corresponding to the frequency of the commercial power supply 110*a*, is superimposed on a direct-current component. Therefore, the voltage does not greatly pulsate. In a case where the commercial power supply 110*a* is a three-phase commercial power supply, the frequency of the voltage ripple has a primary component that is six times the frequency of the power supply voltage Vs. In a case where the power input from the commercial power supply 110*a* and the power output from the inverter 310 do not change, the amplitude of the voltage ripple is determined by the capacitance of the capacitor 210. For example, the voltage ripple generated in the capacitor 210 pulsates in a range in which the maximum value of the voltage ripple is less than twice the minimum value of the voltage ripple.

The configuration and operation of the control unit 400 are similar to the configuration and operation of the control unit 400 in the second embodiment, but the setting of the specific frequency bandpass unit 450 is different. As described above, a voltage ripple is superimposed on a voltage generated in the capacitor 210 by the smoothing. In a case where the commercial power supply 110 is a single-phase commercial power supply, the frequency of the voltage ripple has a primary component that is twice the frequency of the power supply voltage Vs. In a case where the commercial power supply 110*a* is a three-phase commercial power supply, the frequency of the voltage ripple has a primary component that is six times the frequency of the power supply voltage Vs.

The specific frequency bandpass unit 450 that is a high-pass filter may include an FIR filter or an IIR filter. In the control unit 400, similarly to the second embodiment, a high-pass filter may be equivalently implemented by using a low-pass filter as the specific frequency bandpass unit 450.

In order to simplify the description, similarly to the second embodiment, the attenuation coefficient ζ is set to √(2) such that the second-order low-pass filter becomes the second-order Butterworth filter, but the point at which the signal becomes −3 dB may be changed by adjusting the cutoff angular frequency $\omega_n$ and the attenuation coefficient 2. The pulsatile component can be eliminated from the signal by appropriately designing the cutoff angular frequency $\omega_n$ for the frequency component that is desired to be attenuated. For example, in order to attenuate a pulsatile component ω6f having a frequency six times the power supply frequency generated in the commercial power supply 110*a*, the cutoff angular frequency $\omega_n$ just needs to be designed to be equal to or lower than the frequency of the pulsatile component ω6f, having a frequency six times the power supply frequency. For example, if it is desired to attenuate the pulsatile component ω6f having a frequency six times the power supply frequency by 99% from the detected direct-current bus voltage $V_{dc}$, the cutoff angular frequency $\omega_n$ just needs to be designed to be 1/10 the frequency of the pulsatile component ω6f, having a frequency six times the power supply frequency.

By using a high-pass filter for the detection value of the direct-current bus voltage $V_{dc}$, even when the connected power supply is the commercial power supply 110*a* that is a three-phase commercial power supply, the control unit 400 can improve the accuracy of the pulsation detection, and improve the control performance in the smoothing element current reduction control and the like, similarly to the case where the commercial power supply 110 is a single-phase commercial power supply. Furthermore, by using a high-pass filter for the detection value of the direct-current bus voltage $V_{dc}$, the control unit 400 can prevent an increase in copper loss of the motor 314 and in conduction loss of the inverter 310 caused by the superimposition of a low-frequency pulsatile component on the direct-current bus voltage $V_{dc}$ and the motor current. Furthermore, by using a high-pass filter for the detection value of the direct-current bus voltage $V_{dc}$, the control unit 400 can improve the control performance also in, for example, vibration reduction control of reducing vibrations generated in the motor 314, the compressor 315, and the like, in addition to the smoothing element current reduction control.

Similarly to the second embodiment, the characteristic of the high-pass filter in a case where the high-pass filter is used as the specific frequency bandpass unit 450 can be appropriately set in a manner of software in the control unit 400. The control unit 400 uses a second-order high-pass filter as the specific frequency bandpass unit 450. For example, in a case where the commercial power supply 110*a* is a three-phase commercial power supply, the control unit 400 sets the control band of the specific frequency bandpass unit 450 to be six times or lower than the frequency of the three-phase commercial power supply, and attenuates sixth-order or lower component of the frequency of the three-phase commercial power supply at a rate of –40 dB/decade or more. The frequency of the three-phase commercial power supply is generally 50 Hz or 60 Hz.

As described above, according to the present embodiment, in the power converting apparatus 1*a* connected to the commercial power supply 110*a* that is a three-phase commercial power supply, the control unit 400 can, similarly to the second embodiment, improve the control performance in the smoothing element current reduction control, and the like, of reducing the charge/discharge current 13 of the capacitor 210, by using a high-pass filter as the specific frequency bandpass unit 450.

Fourth Embodiment

In a fourth embodiment, a case will be described where a low-pass filter is used as a specific example of the specific frequency bandpass unit 450. In the fourth embodiment, the commercial power supply 110 connected to the power converting apparatus is a single-phase commercial power supply.

Figure 8:
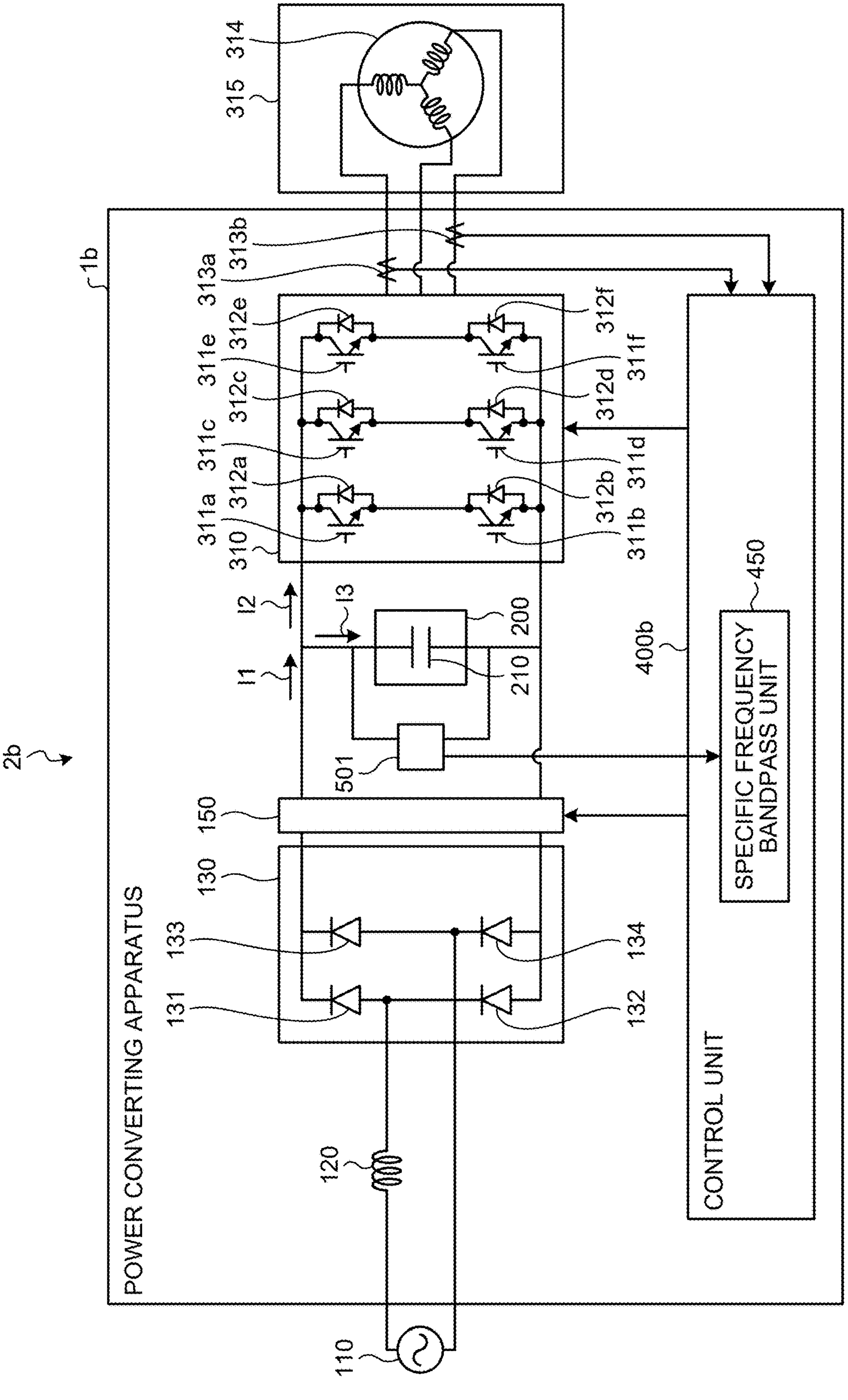
FIG. 8 is a diagram illustrating a configuration example of a power converting apparatus according to a fourth embodiment.

FIG. 8 is a diagram illustrating a configuration example of a power converting apparatus 1*b* according to the fourth embodiment. The power converting apparatus 1*b* is connected to the commercial power supply 110 and the compressor 315. The power converting apparatus 1*b* converts the first alternating-current power of the power supply voltage Vs, supplied from the commercial power supply 110 that is a single-phase commercial power supply, into the second alternating-current power with desired amplitude and phase, and supplies the second alternating-current power to the compressor 315. The power converting apparatus 1*b* includes the reactor 120, the rectifier unit 130, a booster unit 150, the voltage detecting unit 501, the smoothing unit 200, the inverter 310, the current detecting units 313*a* and 313*b*, and a control unit 400*b*. Note that the power converting apparatus 1*b* and the motor 314 included in the compressor 315 constitute a motor drive apparatus 2*b*.

The booster unit 150 boosts a voltage of direct-current power output from the rectifier unit 130 under the control of the control unit 400*b*. The booster unit 150 includes, for example, a booster circuit using a reactor, a switching element, a diode, and the like, but is enough to have a general configuration and is not particularly limited.

Similarly to the control unit 400, the control unit 400*b* controls the operation of the inverter 310 and the motor 314, and controls the operation of the booster unit 150 such that the direct-current bus voltage $V_{dc}$ detected by the voltage detecting unit 501 becomes a desired value. Note that, in the present embodiment, a single control unit 400*b* controls the operation of the inverter 310, the motor 314, and the booster unit 150, but the present disclosure is not limited thereto. A control unit that controls the operation of the inverter 310 and the motor 314 and a control unit that controls the operation of the booster unit 150 may be separately provided. Note that, in a case where the specific frequency bandpass unit 450 is provided in each control unit, the fewer the number of control units, the simpler the overall configuration of the power converting apparatus 1*b* can be.

In the present embodiment, the control unit 400*b* uses a second-order low-pass filter as the specific frequency bandpass unit 450. The control unit 400*b* eliminates a pulsatile component having a frequency 2*n* times the power supply frequency generated in the commercial power supply 110 from the direct-current bus voltage $V_{dc}$, by using the second-order low-pass filter, and prevents the superimposition of a low-frequency pulsatile component on the direct-current bus voltage $V_{dc}'$. By using the direct-current bus voltage $V_{dc}'$ from which a high-frequency component, that is, a pulsatile component has been eliminated by the second-order low-pass filter, the control unit 400*b* can improve the limitation of the operation region of the magnetic flux weakening control caused by the pulsatile component, for example. The second-order low-pass filter is expressed by Equation (2) as described below.

Formula 2

$$G_{LPF(s)} = \frac{\omega_n^2}{s^2 + 2\zeta\omega_n s + \omega_n^2} \quad (2)$$

The attenuation coefficient ζ is a parameter that affects the vibrational property of the response. A filter using √(2) as the attenuation coefficient ζ is called a second-order Butterworth filter, and has a characteristic that the signal becomes –3 dB at the cutoff angular frequency $\omega_n$. By using the second-order low-pass filter, the attenuation performance of the pulsatile component can be improved from –20 dB/decade to –40 dB/decade as compared with the first-order low-pass filter. Therefore, both the response performance and the attenuation performance of the pulsatile component can be achieved.

In order to simplify the description, here, the attenuation coefficient ζ is set to √(2) such that the second-order low-pass filter becomes the second-order Butterworth filter, but the point at which the signal becomes –3 dB may be changed by adjusting the cutoff angular frequency $\omega_n$ and the attenuation coefficient ζ. The pulsatile component can be eliminated from the signal by appropriately designing the cutoff angular frequency $\omega_n$ for the frequency component that is desired to be attenuated. For example, in order to attenuate the pulsatile component ω2f having a frequency twice the power supply frequency generated in the commercial power supply 110, the cutoff angular frequency $\omega_n$ just needs to be designed to be equal to or lower than the frequency of the pulsatile component ω2f, having a frequency twice the power supply frequency. For example, if it is desired to attenuate the pulsatile component ω2f having a frequency twice the power supply frequency by 99% from the detected direct-current bus voltage $V_{dc}$, the cutoff angular frequency $\omega_n$ just needs to be designed to be 1/10 the frequency of the pulsatile component ω2f, having a frequency twice the power supply frequency.

Figure 9:
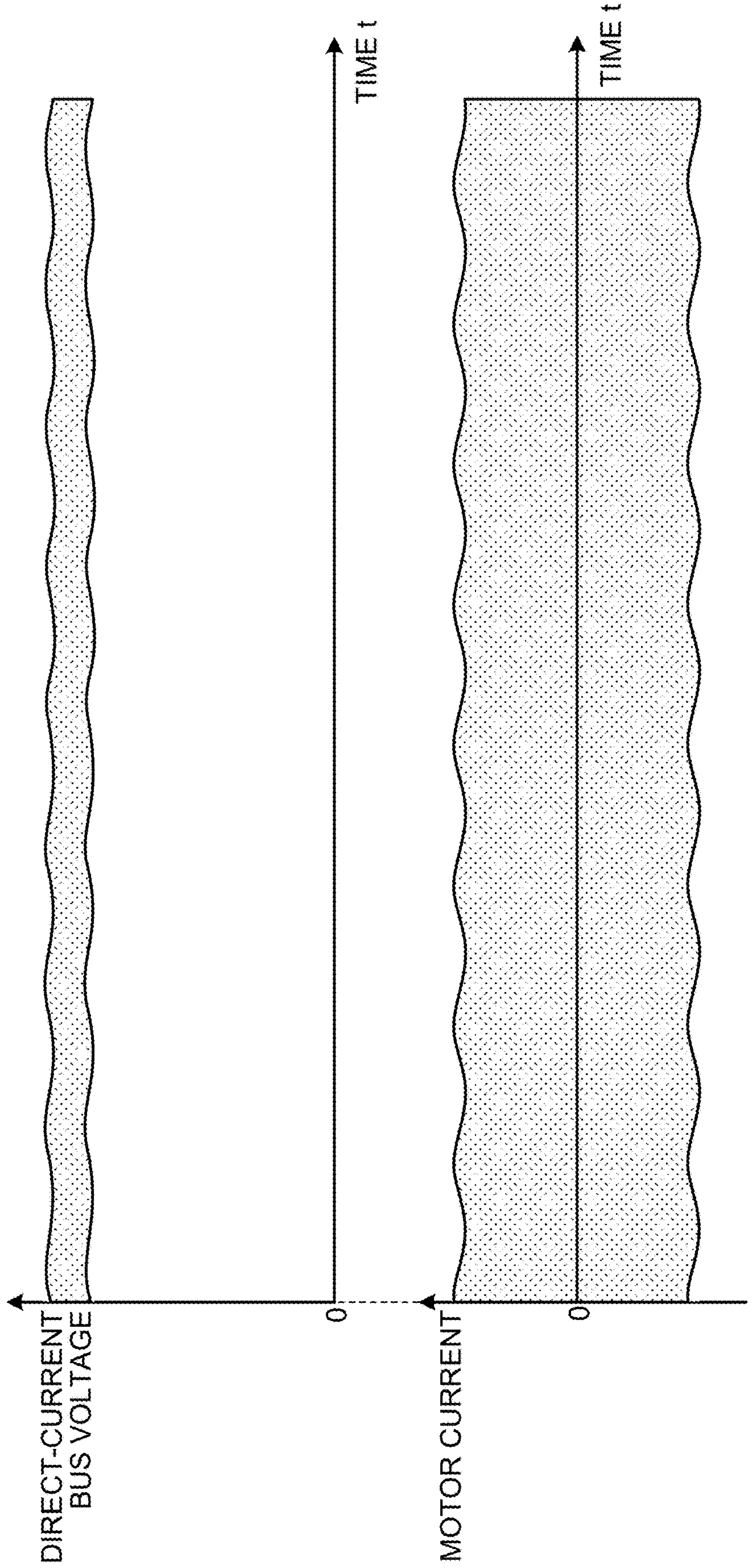
FIG. 9 is a diagram, as a comparative example, illustrating an example of operation waveforms in a case where a second-order low-pass filter is not used as a specific frequency bandpass unit in the power converting apparatus.

Here, as a comparative example, operation waveforms in a case where the second-order low-pass filter is not used as the specific frequency bandpass unit 450 in the power converting apparatus will be described as a comparative example. FIG. 9 is a diagram, as a comparative example, illustrating an example of operation waveforms in a case where the second-order low-pass filter is not used as the specific frequency bandpass unit in the power converting apparatus. In FIG. 9, an upper diagram illustrates the direct-current bus voltage $V_{dc}$, and a lower diagram illustrates the motor current. Note that the horizontal axis represents time in both the upper diagram and the lower diagram. In a case where the second-order low-pass filter is not used for the direct-current bus voltage $V_{dc}$, an average value of the direct-current bus voltage $V_{dc}$ cannot be acquired due to an error in detection timing, so that the low-frequency pulsatile component may be superimposed on the direct-current bus voltage $V_{dc}$ in some cases. In such a case, the low-frequency pulsatile component is superimposed also on the direct-current bus voltage $V_{dc}$ by feedback control resulting from the control of the direct-current bus voltage. Furthermore, the direct-current bus voltage $V_{dc}$ pulsates and thus the motor current also pulsates. As a result, problems arise such as an increase in loss and a reduction in drivable range of the motor.

Figure 10:
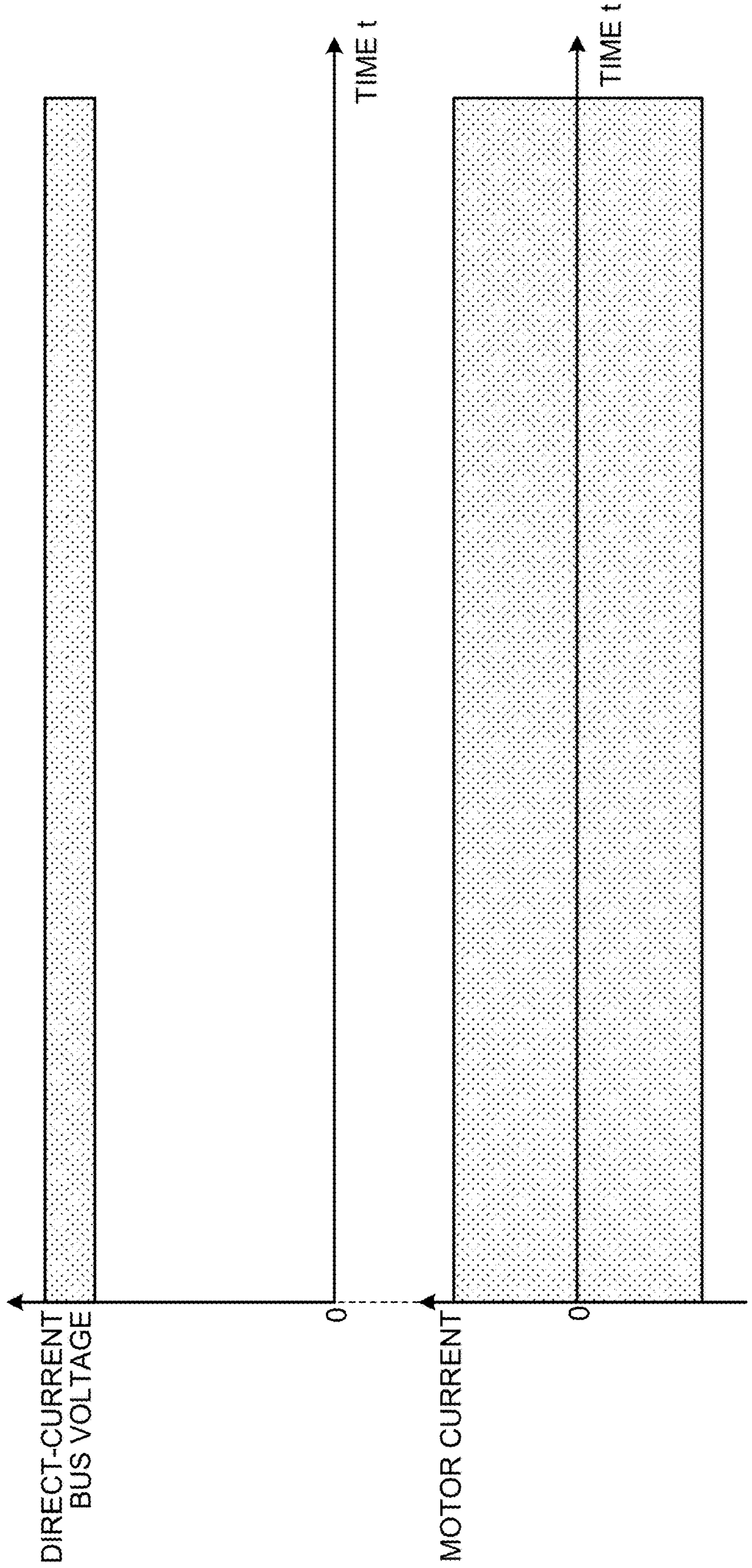
FIG. 10 is a diagram illustrating an example of operation waveforms in a case where the second-order low-pass filter is used as the specific frequency bandpass unit in the power converting apparatus according to the fourth embodiment.

FIG. 10 is a diagram illustrating an example of operation waveforms in a case where the second-order low-pass filter is used as the specific frequency bandpass unit 450 in the power converting apparatus 1*b* according to the fourth embodiment. By attenuating a pulsatile component of the direct-current bus voltage $V_{dc}$ by using the second-order low-pass filter, the control unit 400*b* can reduce the superimposition of the low-frequency component having a frequency twice or lower the power supply frequency caused by an error in voltage detection timing. Accordingly, the control unit 400*b* can reduce a low-order harmonic of the motor current. Therefore, the control unit 400*b* can acquire an effect of reducing the conduction loss of the inverter 310 and the copper loss of the motor 314. Furthermore, the control unit 400*b* can acquire a noise reduction effect by eliminating a beat component. As described above, by using the direct-current bus voltage $V_{dc}'$ from which a high-frequency component, that is, a pulsatile component has been eliminated by the second-order low-pass filter, the control unit 400*b* can improve the limitation of the operation region of the magnetic flux weakening control caused by the pulsatile component, for example. These effects, such as pulsation eliminating effects achieved by the second-order low-pass filter, are profound particularly in a region such as a low-speed high-load range where a current becomes large, and under an operating condition where pulsation of 2n component generated in a direct-current voltage output from the rectifier unit 130 without boosting operation is large.

Note that the characteristic of the low-pass filter in a case where the low-pass filter is used as the specific frequency bandpass unit 450 can be appropriately set in a manner of software in the control unit 400*b*. The control unit 400*b* uses the second-order low-pass filter as the specific frequency bandpass unit 450. For example, the power converting apparatus 1*b* includes the booster unit 150 that boosts a voltage of the direct-current power output from the rectifier unit 130. In a case where the commercial power supply 110 is a single-phase commercial power supply, the control unit 400*b* sets the control band of the specific frequency bandpass unit 450 to be twice or lower than the frequency of the single-phase commercial power supply. In addition, the control unit 400*b* attenuates a 2n-th order component of the frequency of the single-phase commercial power supply at a rate of −40 dB/decade or more, where n is an integer of two or more, and controls the operation of the booster unit 150 by using the direct-current bus voltage $V_{dc}'$.

A hardware configuration of the control unit 400*b* included in the power converting apparatus 1*b* will be described. Similarly to the control unit 400 in the first embodiment, the control unit 400*b* is implemented by the processor 91 and the memory 92.

As described above, according to the present embodiment, in the power converting apparatus 1*b* connected to the commercial power supply 110 that is a single-phase commercial power supply, the control unit 400*b* can improve the limitation of the operation region of the magnetic flux weakening control caused by the pulsatile component by using a low-pass filter as the specific frequency bandpass unit 450.

Fifth Embodiment

In the fourth embodiment, the case where the commercial power supply 110 is a single-phase commercial power supply has been described as an example of using a low-pass filter as the specific frequency bandpass unit 450. In the fifth embodiment, a case where the commercial power supply 110*a* is a three-phase commercial power supply will be described as an example of using a low-pass filter as the specific frequency bandpass unit 450.

Figure 11:
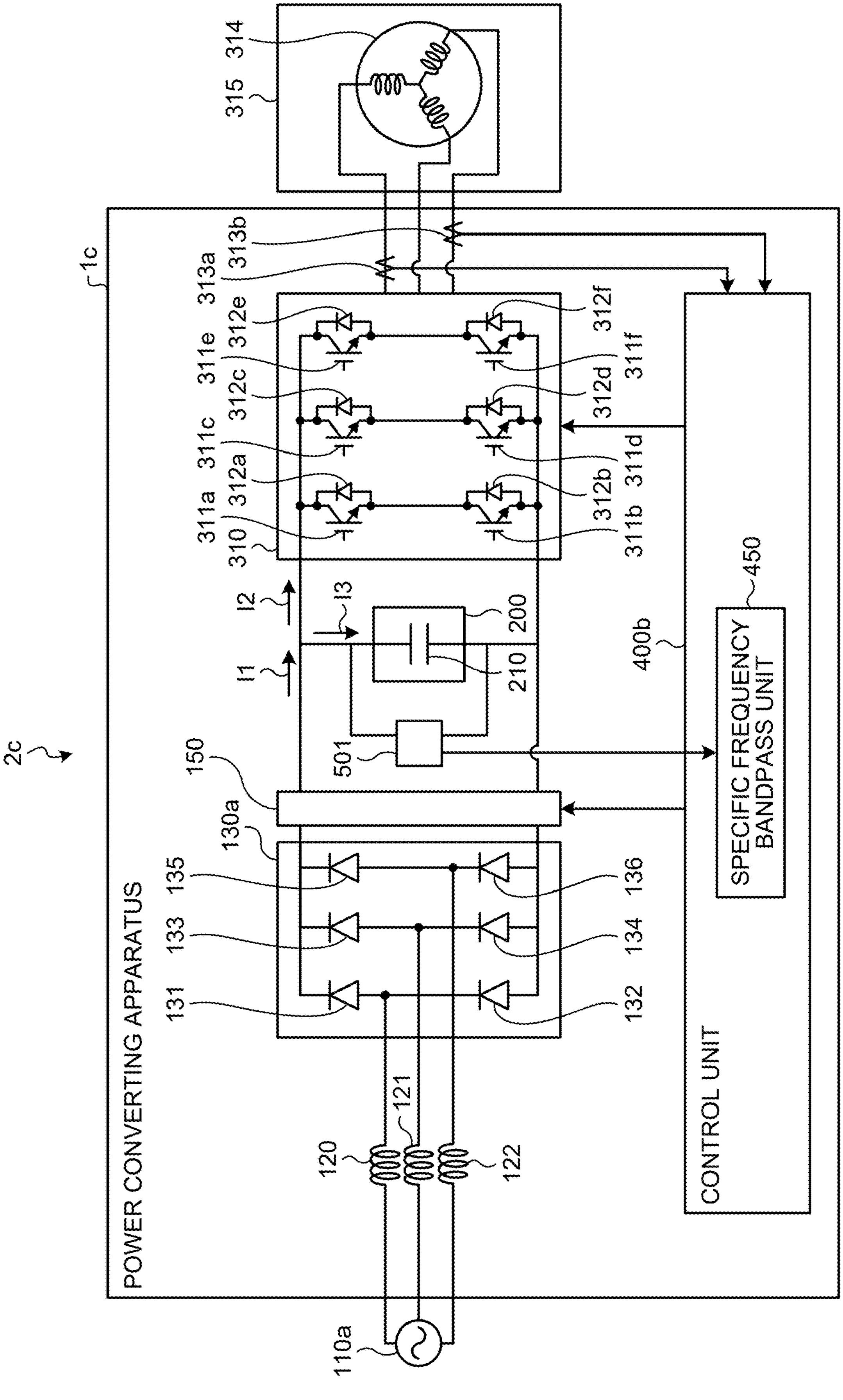
FIG. 11 is a diagram illustrating a configuration example of a power converting apparatus according to a fifth embodiment.

FIG. 11 is a diagram illustrating a configuration example of a power converting apparatus 1*c* according to the fifth embodiment. The power converting apparatus 1*c* is connected to the commercial power supply 110*a* and the compressor 315. The power converting apparatus 1*c* converts the first alternating-current power of the power supply voltage Vs, supplied from the commercial power supply 110*a* that is a three-phase commercial power supply, into the second alternating-current power with desired amplitude and phase, and supplies the second alternating-current power to the compressor 315. The power converting apparatus 1*c* includes the reactors 120 to 122, the rectifier unit 130*a*, the booster unit 150, the voltage detecting unit 501, the smoothing unit 200, the inverter 310, the current detecting units 313*a* and 313*b*, and the control unit 400*b*. Note that the power converting apparatus 1*c* and the motor 314 included in the compressor 315 constitute a motor drive apparatus 2*c*.

The configuration and operation of the control unit 400*b* are similar to the configuration and operation of the control unit 400*b* in the fourth embodiment, but the setting of the specific frequency bandpass unit 450 is different. As described above, a voltage ripple is superimposed on a voltage generated in the capacitor 210 by the smoothing. In a case where the commercial power supply 110 is a single-phase commercial power supply, the frequency of the voltage ripple has a primary component that is twice the frequency of the power supply voltage Vs. In a case where the commercial power supply 110*a* is a three-phase commercial power supply, the frequency of the voltage ripple has a primary component that is six times the frequency of the power supply voltage Vs.

In the present embodiment, the control unit 400*b* uses the second-order low-pass filter as the specific frequency bandpass unit 450. The control unit 400*b* eliminates a pulsatile component having a frequency 6*n* times the power supply frequency generated in the commercial power supply 110_a_ from the direct-current bus voltage $V_{dc}$ by using the second-order low-pass filter, and prevents the superimposition of a low-frequency pulsatile component on the direct-current bus voltage $V_{dc}'$. By using the direct-current bus voltage $V_{dc}'$ from which a high-frequency component, that is, a pulsatile component has been eliminated by the second-order low-pass filter, the control unit 400_b_ can improve the limitation of the operation region of the magnetic flux weakening control caused by the pulsatile component, for example.

In order to simplify the description, similarly to the fourth embodiment, the attenuation coefficient 2 is set to √(2) such that the second-order low-pass filter becomes the second-order Butterworth filter, but the point at which the signal becomes −3 dB may be changed by adjusting the cutoff angular frequency $\omega_n$ and the attenuation coefficient 2. The pulsatile component can be eliminated from the signal by appropriately designing the cutoff angular frequency $\omega_n$ for the frequency component that is desired to be attenuated. For example, in order to attenuate the pulsatile component ω6f having a frequency six times the power supply frequency generated in the commercial power supply 110_a_, the cutoff angular frequency $\omega_n$ just needs to be designed to be equal to or lower than the frequency of the pulsatile component ω6f, having a frequency six times the power supply frequency. For example, if it is desired to attenuate the pulsatile component ω6f having a frequency six times the power supply frequency by 99% from the detected direct-current bus voltage $V_{dc}$, the cutoff angular frequency $\omega_n$ just needs to be designed to be 1/10 the frequency of the pulsatile component ω6f, having a frequency six times the power supply frequency.

By attenuating a pulsatile component of the direct-current bus voltage $V_{dc}$ by using the second-order low-pass filter, even when the connected power supply is the commercial power supply 110_a_ that is a three-phase commercial power supply, the control unit 400_b_ can reduce the superimposition of the low-frequency component having a frequency twice or lower the power supply frequency caused by an error in voltage detection timing, similarly to the case where the commercial power supply 110 is a single-phase commercial power supply. Accordingly, the control unit 400_b_ can reduce a low-order harmonic of the motor current. Therefore, the control unit 400_b_ can acquire an effect of reducing the conduction loss of the inverter 310 and the copper loss of the motor 314. Furthermore, the control unit 400_b_ can acquire a noise reduction effect by eliminating a beat component. As described above, by using the direct-current bus voltage $V_{dc}'$ from which a high-frequency component, that is, a pulsatile component has been eliminated by the second-order low-pass filter, the control unit 400_b_ can improve the limitation of the operation region of the magnetic flux weakening control caused by the pulsatile component, for example. These effects, such as pulsation eliminating effects achieved by the second-order low-pass filter, are profound particularly in a region such as a low-speed high-load range where a current becomes large, and under an operating condition where pulsation of 6_n_ component generated in a direct-current voltage output from the rectifier unit 130_a_ without boosting operation is large.

Similarly to the fourth embodiment, the characteristic of the low-pass filter in a case where the low-pass filter is used as the specific frequency bandpass unit 450 can be appropriately set in a manner of software in the control unit 400_b_. The control unit 400_b_ uses the second-order low-pass filter as the specific frequency bandpass unit 450. For example, the power converting apparatus 1_c_ includes the booster unit 150 that boosts a voltage of the direct-current power output from the rectifier unit 130_a_. In a case where the commercial power supply 110_a_ is a three-phase commercial power supply, the control unit 400_b_ sets the control band of the specific frequency bandpass unit 450 to be six times or lower than the frequency of the three-phase commercial power supply. In addition, the control unit 400_b_ attenuates a 6n-th order component of the frequency of the three-phase commercial power supply at a rate of −40 dB/decade or more, where n is an integer of two or more, and controls the operation of the booster unit 150 by using the direct-current bus voltage $V_{dc}'$.

As described above, according to the present embodiment, in the power converting apparatus 1_c_ connected to the commercial power supply 110_a_ that is a three-phase commercial power supply, similarly to the fourth embodiment, the control unit 400_b_ can improve the limitation of the operation region of the magnetic flux weakening control caused by the pulsatile component by using a low-pass filter as the specific frequency bandpass unit 450.

Sixth Embodiment

In a sixth embodiment, a case will be described where the specific frequency bandpass unit 450 includes a plurality of filters, selects an output from each filter, and outputs the selected output as the direct-current bus voltage $V_{dc}'$. The specific frequency bandpass unit 450 of the present embodiment can be applied to any power converting apparatus of the first to fifth embodiments. Here, as an example, the power converting apparatus 1 in the first and second embodiments will be described as an example.

Figure 12:
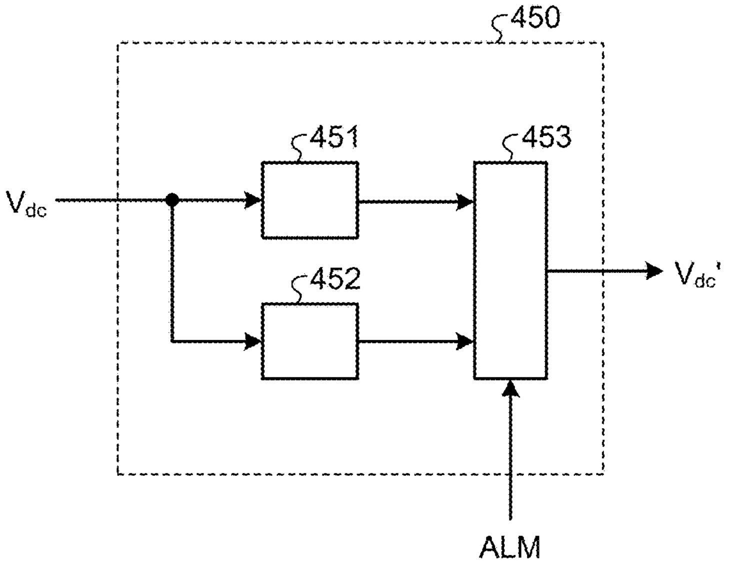
FIG. 12 is a block diagram illustrating a configuration example of a specific frequency bandpass unit included in a control unit of a power converting apparatus according to a sixth embodiment.

FIG. 12 is a block diagram illustrating a configuration example of the specific frequency bandpass unit 450 included in the control unit 400 of the power converting apparatus 1 according to the sixth embodiment. The specific frequency bandpass unit 450 includes a first filter 451, a second filter 452, and a selection unit 453.

The first filter 451 is an n-th order filter, where n is an integer of two or more. That is, the first filter 451 is a filter with a second order or higher. The first filter 451 is a high-pass filter in the second and third embodiments, and is a low-pass filter in the fourth and fifth embodiments. An FIR filter, an IIR filter, or the like may be used as the first filter 451.

The second filter 452 is a first-order filter in which n=1. That is, the second filter 452 is a filter with a smaller order than the first filter 451. The second filter 452 is a high-pass filter in the second and third embodiments, and is a low-pass filter in the fourth and fifth embodiments. An FIR filter, an IIR filter, or the like may be used as the second filter 452.

The selection unit 453 selects an output from the first filter 451 or an output from the second filter 452 depending on a computing load of the control unit 400. The selection unit 453 acquires a signal ALM indicating the computing load of the control unit 400. The selection unit 453 may acquire the signal ALM indicating the computing load of the control unit 400 from a configuration (not illustrated) that monitors the processing of the control unit 400, or from the configuration of the control unit 400 illustrated in FIG. 4 excluding the specific frequency bandpass unit 450. The signal ALM includes, for example, a computation time indicating a time required for a defined computation, a computation speed indicating a speed of the defined computation, and the like. The selection unit 453 attenuates a pulsatile component of the direct-current bus voltage $V_{dc}$ by using the first filter 451 that is a high-order filter in an operation region where the computing load is light and there is a margin for computation time. On the other hand, the selection unit 453 selects the output from the second filter 452 that is a first-order filter in an operation region where the computing load is heavy and there is no margin for the computation time. Since the specific frequency bandpass unit 450 outputs the output from the second filter 452 as the direct-current bus voltage $V_{dc}'$, the control unit 400 can allocate computation time to other processes in a case where the computing load is heavy.

Note that, since the specific frequency bandpass unit 450 uses only the output from one of the first filter 451 and the second filter 452, the computation may be stopped for the filter whose output is not selected. With such a configuration, the specific frequency bandpass unit 450 can further reduce the computing load of the control unit 400.

Furthermore, the specific frequency bandpass unit 450 may include a plurality of filters with different orders as the first filter 451. With such a configuration, in a case where the computing load of the control unit 400 becomes heavy, the specific frequency bandpass unit 450 can switch to the output from the filter with a smaller order in stages according to the value of the signal ALM.

As described above, according to the present embodiment, in the power converting apparatus 1, the specific frequency bandpass unit 450 of the control unit 400 is configured to switch the order of the filter to be used depending on the computing load of the control unit 400. With such a configuration, depending on the computing load of the control unit 400, the specific frequency bandpass unit 450 can use a high-order filter when there is a margin for computation time, and can use a low-order filter when there is no margin for computation time.

Seventh Embodiment

Figure 13:
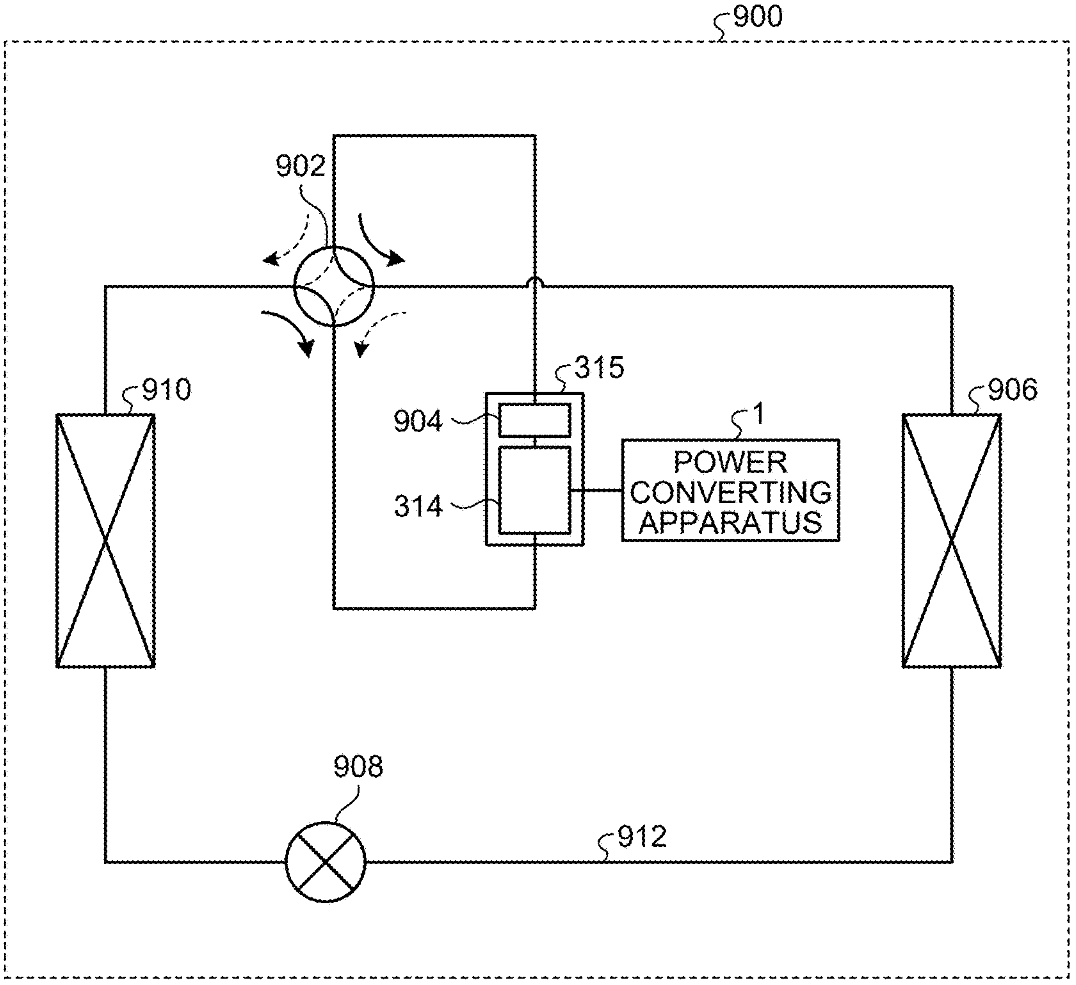
FIG. 13 is a diagram illustrating a configuration example of a refrigeration-cycle application device according to a seventh embodiment.

FIG. 13 is a diagram illustrating a configuration example of a refrigeration-cycle application device 900 according to a seventh embodiment. The refrigeration-cycle application device 900 according to the seventh embodiment includes the power converting apparatus 1 described in the first and second embodiments. Note that the refrigeration-cycle application device 900 can include the power converting apparatus 1*a* described in the third embodiment, the power converting apparatus 1*b* described in the fourth embodiment, the power converting apparatus 1*c* described in the fifth embodiment, and the like, but here, a case of including the power converting apparatus 1 will be described as an example. The refrigeration-cycle application device 900 according to the seventh embodiment can be applied to a product including a refrigeration cycle, such as an air conditioner, a refrigerator, a freezer, or a heat pump water heater. Note that, in FIG. 13, constituent elements having functions similar to those in the first embodiment are denoted by the same reference numerals as those in the first embodiment.

The refrigeration-cycle application device 900 includes the compressor 315 incorporating the motor 314 in the first embodiment, a four-way valve 902, an indoor heat exchanger 906, an expansion valve 908, an outdoor heat exchanger 910, which are mounted to the refrigeration-cycle application device 900 via a refrigerant pipe 912.

Inside the compressor 315, a compression mechanism 904 that compresses a refrigerant and the motor 314 that operates the compression mechanism 904 are provided.

The refrigeration-cycle application device 900 can perform a heating operation or a cooling operation by a switching operation of the four-way valve 902. The compression mechanism 904 is driven by the variable-speed controlled motor 314.

During the heating operation, as indicated by solid arrows, a refrigerant is pressurized and discharged by the compression mechanism 904, passes through the four-way valve 902, the indoor heat exchanger 906, the expansion valve 908, the outdoor heat exchanger 910, and the four-way valve 902, and returns to the compression mechanism 904.

During the cooling operation, as indicated by broken arrows, the refrigerant is pressurized and discharged by the compression mechanism 904, passes through the four-way valve 902, the outdoor heat exchanger 910, the expansion valve 908, the indoor heat exchanger 906, and the four-way valve 902, and returns to the compression mechanism 904.

During the heating operation, the indoor heat exchanger 906 acts as a condenser and releases heat, and the outdoor heat exchanger 910 acts as an evaporator and absorbs heat. During the cooling operation, the outdoor heat exchanger 910 acts as a condenser and releases heat, and the indoor heat exchanger 906 acts as an evaporator and absorbs heat. The expansion valve 908 decompresses and expands the refrigerant.

The configurations described in the above embodiments are just examples and can be combined with other known techniques. The embodiments can be combined with each other and the configurations can be partially omitted or changed without departing from the gist.

The invention claimed is:

1. A power converting apparatus comprising:

a rectifier rectifying first alternating-current power supplied from a commercial power supply;

a capacitor connected to an output end of the rectifier;

an inverter connected across the capacitor, the inverter generating second alternating-current power and outputting the second alternating-current power to a motor;

a detecting circuitry detecting a first direct-current bus voltage, the first direct-current bus voltage being a voltage across the capacitor; and a controller including a specific frequency bandpass circuitry passing a defined frequency band among power-supply pulsatile components contained in the first direct-current bus voltage, the controller controlling an operation of the inverter and the motor by using a second direct-current bus voltage, the second direct-current bus voltage being the first direct-current bus voltage after passing through the specific frequency bandpass circuitry, wherein in a case where the commercial power supply is a single-phase commercial power supply, the controller sets a control band of the specific frequency bandpass circuitry to be twice or lower than a frequency of the single-phase commercial power supply, and attenuates a second-order or lower component of the frequency of the single-phase commercial power supply at a rate of −40 dB/decade or more.

2. The power converting apparatus according to claim 1, wherein the specific frequency bandpass circuitry includes:

a first filter with a second order or higher;

a second filter with a smaller order than the first filter; and a selection circuitry selecting an output from the first filter or an output from the second filter depending on a computing load.

3. A motor drive apparatus comprising the power converting apparatus according to claim 1.

4. A refrigeration-cycle application device comprising the power converting apparatus according to claim 1.

5. A power converting apparatus comprising:

a rectifier rectifying first alternating-current power supplied from a commercial power supply;

a capacitor connected to an output end of the rectifier;

an inverter connected across the capacitor, the inverter generating second alternating-current power and outputting the second alternating-current power to a motor;

a detecting circuitry detecting a first direct-current bus voltage, the first direct-current bus voltage being a voltage across the capacitor; and a controller including a specific frequency bandpass circuitry passing a defined frequency band among power-supply pulsatile components contained in the first direct-current bus voltage, the control controller controlling an operation of the inverter and the motor by using a second direct-current bus voltage, the second direct-current bus voltage being the first direct-current bus voltage after passing through the specific frequency bandpass circuitry, wherein in a case where the commercial power supply is a three-phase commercial power supply, the controller sets a control band of the specific frequency bandpass circuitry to be six times or lower than a frequency of the three-phase commercial power supply, and attenuates a six-order or lower component of the frequency of the three-phase commercial power supply at a rate of −40 dB/decade or more.

6. The power converting apparatus according to claim 5, wherein the specific frequency bandpass circuitry includes:

a first filter with a second order or higher;

a second filter with a smaller order than the first filter; and a selection circuitry selecting an output from the first filter or an output from the second filter depending on a computing load.

7. A motor drive apparatus comprising the power converting apparatus according to claim 5.

8. A refrigeration-cycle application device comprising the power converting apparatus according to claim 5.

9. A power converting apparatus comprising:

a rectifier rectifying first alternating-current power supplied from a commercial power supply;

a capacitor connected to an output end of the rectifier;

an inverter connected across the capacitor, the inverter generating second alternating-current power and outputting the second alternating-current power to a motor;

a detecting circuitry detecting a first direct-current bus voltage, the first direct-current bus voltage being a voltage across the capacitor;

a controller including a specific frequency bandpass circuitry passing a defined frequency band among power-supply pulsatile components contained in the first direct-current bus voltage, the controller controlling an operation of the inverter and the motor by using a second direct-current bus voltage, the second direct-current bus voltage being the first direct-current bus voltage after passing through the specific frequency bandpass circuitry; and a booster circuitry boosting a voltage of direct-current power output from the rectifier unit, wherein in a case where the commercial power supply is a single-phase commercial power supply, the controller sets a control band of the specific frequency bandpass circuitry to be twice or lower than a frequency of the single-phase commercial power supply, and attenuates a 2n-th order component of the frequency of the single-phase commercial power supply at a rate of −40 dB/decade or more, where n is an integer of two or more, and controls an operation of the booster circuitry by using the second direct-current bus voltage.

10. The power converting apparatus according to claim 9, wherein the specific frequency bandpass circuitry includes:

a first filter with a second order or higher;

a second filter with a smaller order than the first filter; and a selection circuitry selecting an output from the first filter or an output from the second filter depending on a computing load.

11. A motor drive apparatus comprising the power converting apparatus according to claim 9.

12. A refrigeration-cycle application device comprising the power converting apparatus according to claim 9.

* * * * *